(12) United States Patent
Ko et al.

(10) Patent No.: US 12,440,164 B2
(45) Date of Patent: Oct. 14, 2025

(54) APPARATUS AND METHOD FOR ESTIMATING OPTICAL-BASED FORCE

(71) Applicant: SAMSUNG ELECTRONICS CO., LTD., Suwon-si (KR)

(72) Inventors: Byung Hoon Ko, Hwaseong-si (KR); Seung Woo Noh, Seongnam-si (KR); Tak Hyung Lee, Seoul (KR); Sang Yun Park, Hwaseong-si (KR); Jin Woo Choi, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 17/866,940

(22) Filed: Jul. 18, 2022

(65) Prior Publication Data

US 2023/0301593 A1    Sep. 28, 2023

(30) Foreign Application Priority Data

Mar. 25, 2022    (KR) .................. 10-2022-0037581

(51) Int. Cl.
*A61B 5/00* (2006.01)
*A61B 5/021* (2006.01)
(Continued)

(52) U.S. Cl.
CPC ........ *A61B 5/6843* (2013.01); *A61B 5/02108* (2013.01); *A61B 5/02225* (2013.01);
(Continued)

(58) Field of Classification Search
CPC .............. A61B 5/6843; A61B 5/02108; A61B 5/02225; A61B 5/02427; A61B 5/6831; A61B 2562/0233; G01L 1/24
See application file for complete search history.

(56) References Cited

U.S. PATENT DOCUMENTS 8,243,024 B2    8/2012    Senft et al.
9,829,405 B2    11/2017    Kusima et al.
(Continued)

FOREIGN PATENT DOCUMENTS

JP    2007-209374 A    8/2007
JP    2008-79688 A    4/2008
(Continued)

OTHER PUBLICATIONS

Communication issued Jul. 27, 2023 by the European Patent Office in counterpart European Patent Application No. 22208299.2.
(Continued)

*Primary Examiner* — Dixomara Vargas
(74) *Attorney, Agent, or Firm* — Sughrue Mion, PLLC

(57) ABSTRACT

Provided i an apparatus configured to estimate an optical-based force, the apparatus including a main body, a cover disposed at a first side of the main body and configured to contact an object, a support part connected to two sides of the cover, supporting the cover, and protruding toward an inside of the main body, and an optical sensor disposed on the support part, the optical sensor including a light source configured to emit light onto a reflector, a detector configured to detect light reflected from the reflector, and a circuit unit configured to estimate a contact force of the object based on the detected light.

14 Claims, 15 Drawing Sheets

(51) Int. Cl.
  *A61B 5/022* (2006.01)
  *A61B 5/024* (2006.01)
  *G01L 1/24* (2006.01)

(52) U.S. Cl.
  CPC ........ *A61B 5/02427* (2013.01); *A61B 5/6831* (2013.01); *G01L 1/24* (2013.01); *A61B 2562/0233* (2013.01)

(56) References Cited

U.S. PATENT DOCUMENTS

| | | | |
|---|---|---|---|
| 10,772,505 B2 | 9/2020 | Kim | |
| 10,880,466 B2 | 12/2020 | Allie et al. | |
| 11,234,647 B2 | 2/2022 | Kang et al. | |
| 11,712,206 B2* | 8/2023 | Ko | A61B 5/0261 600/480 |
| 12,161,393 B2* | 12/2024 | Holmberg | A61B 90/06 |
| 2009/0267918 A1* | 10/2009 | Lu | G06F 3/0416 250/221 |
| 2010/0036265 A1 | 2/2010 | Kim et al. | |
| 2015/0374249 A1 | 12/2015 | Elliott et al. | |
| 2018/0338803 A1* | 11/2018 | Meglan | A61B 1/00137 |
| 2019/0250754 A1 | 8/2019 | Ely et al. | |
| 2019/0310151 A1* | 10/2019 | Nagura | G01P 15/093 |
| 2021/0052320 A1* | 2/2021 | Holmberg | A61B 90/06 |
| 2021/0059537 A1 | 3/2021 | Nakagawa et al. | |
| 2021/0330261 A1 | 10/2021 | Jung et al. | |
| 2021/0356322 A1 | 11/2021 | Nam et al. | |
| 2021/0369124 A1* | 12/2021 | Sheridan | A61B 5/02028 |
| 2022/0008009 A1 | 1/2022 | Kang et al. | |

FOREIGN PATENT DOCUMENTS

| | | |
|---|---|---|
| JP | 6067077 B1 | 1/2010 |
| JP | 2015-66160 A | 4/2015 |
| JP | 2017-58186 A | 3/2017 |
| JP | 6256619 B2 | 1/2018 |
| JP | 2019-201980 A | 11/2019 |
| JP | 6706465 B2 | 6/2020 |
| KR | 10-0660349 B1 | 12/2006 |
| KR | 10-0681387 B1 | 2/2007 |
| KR | 10-1432038 B1 | 9/2014 |
| KR | 10-2018-0059802 A | 6/2018 |
| KR | 10-2020-0014523 A | 2/2020 |
| KR | 10-2115437 B1 | 5/2020 |
| KR | 10-2021-0131132 A | 11/2021 |
| KR | 10-2021-0142304 A | 11/2021 |
| WO | 2021/033455 A1 | 2/2021 |

OTHER PUBLICATIONS

Office Action issued on Dec. 1, 2023 by the Korean Patent Office in corresponding KR patent application No. 10-2022-0037581.

* cited by examiner

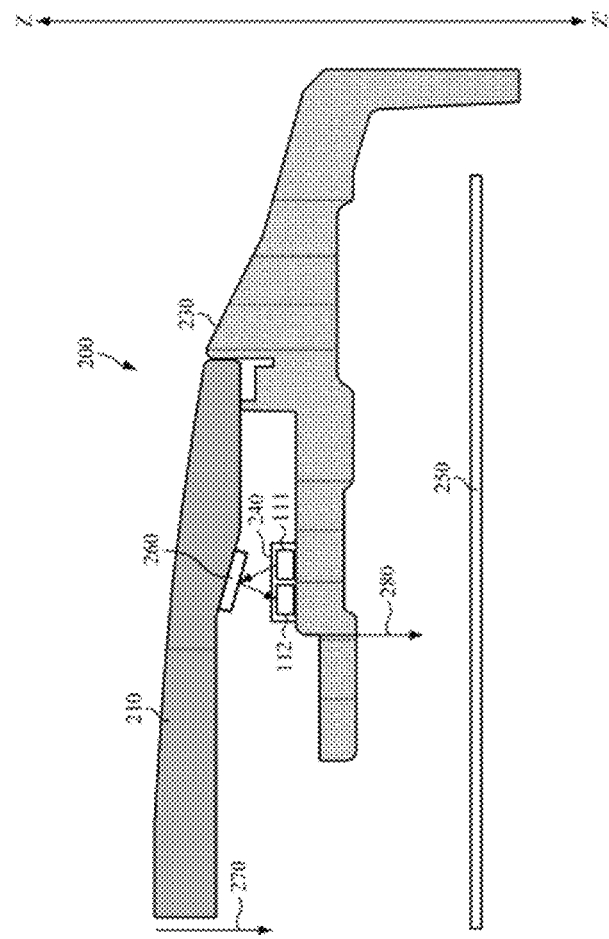

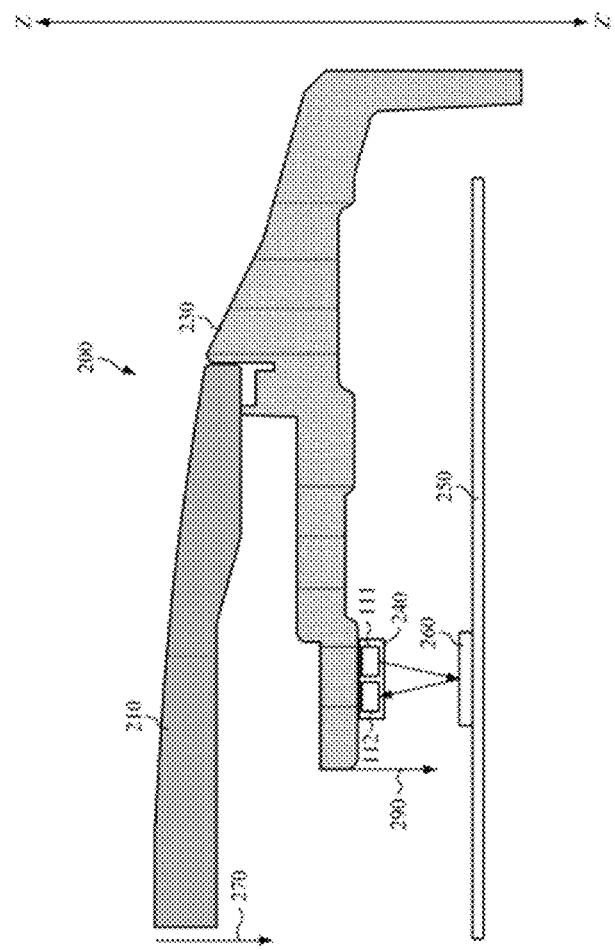

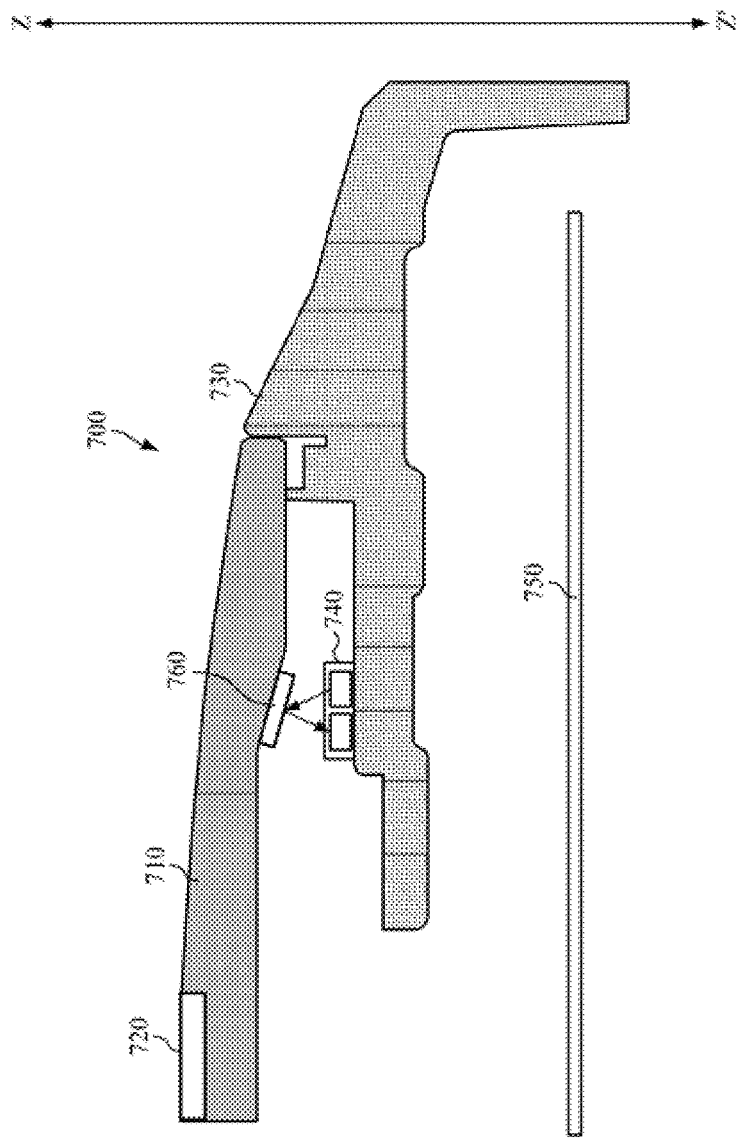

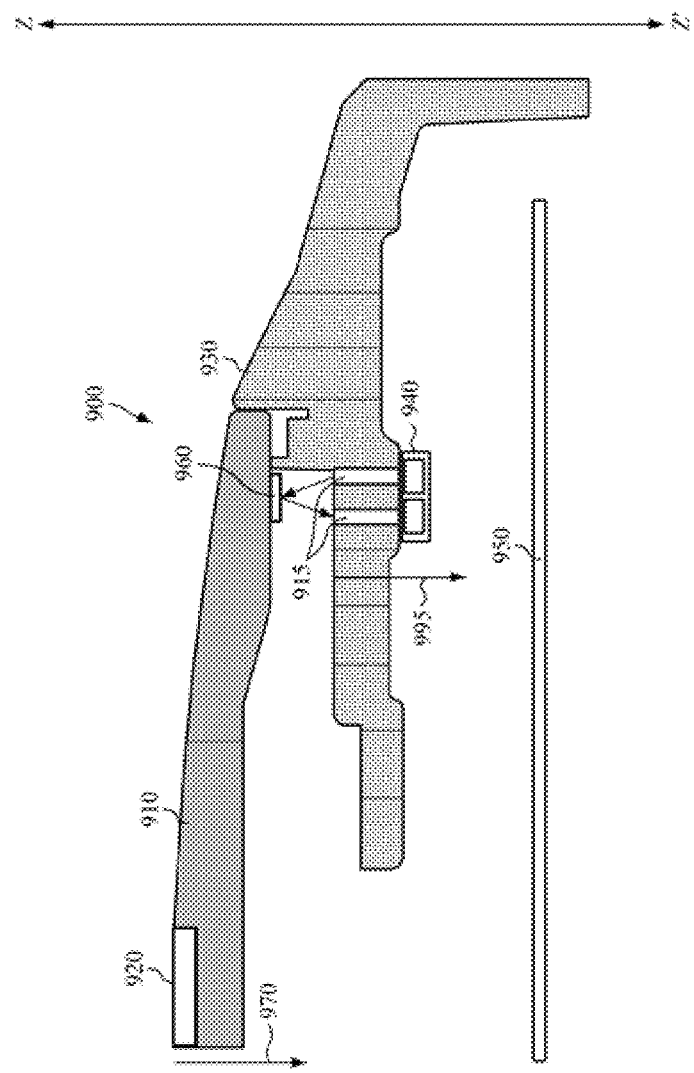

US 12,440,164 B2

APPARATUS AND METHOD FOR ESTIMATING OPTICAL-BASED FORCE

CROSS-REFERENCE TO RELATED APPLICATION

This application claims priority from Korean Patent Application No. 10-2022-0037581, filed on Mar. 25, 2022, in the Korean Intellectual Property Office, the entire disclosure of which is incorporated herein by reference for all purposes.

BACKGROUND

1. Field

Example embodiments of the present disclosure relate to an apparatus and method for estimating an optical-based force.

2. Description of Related Art

With the development of medical science and a longer average life span, there is a growing interest in medical devices, ranging from large medical devices for use in hospitals or medical examination institutions, to small portable medical devices and healthcare devices that individuals can carry with them. Medical devices for measuring bio-information may be generally classified into invasive type devices and non-invasive type devices. The non-invasive type device has an effect of simply detecting bio-information without causing pain to a subject.

As an example of the non-invasive type device, a device in the form of a chip may be mounted in a wearable device or a smartphone for measuring force applied to an object. Recently, there is a growing interest in techniques for simply measuring a contact force by using light, rather than using a method of directly measuring a contact force of an object applied to an object.

SUMMARY

One or more example embodiments provide an apparatus configured to estimate an optical-based force.

According to an aspect of an example embodiment, there is provided an apparatus configured to estimate an optical-based force, the apparatus including a main body, a cover disposed at a first side of the main body and configured to contact an object, a support part connected to two sides of the cover, supporting the cover, and protruding toward an inside of the main body, and an optical sensor disposed on the support part, the optical sensor including a light source configured to emit light onto a reflector, a detector configured to detect light reflected from the reflector, and a circuit unit configured to estimate a contact force of the object based on the detected light.

In the optical sensor, the circuit unit may be further configured to obtain a degree of deformation of the support part, which is deformed by a pressing force of the object on the cover, based on an intensity of an optical signal, and estimate the contact force of the object based on the obtained degree of deformation.

At least one or more optical sensors may be disposed at a first side or a second side of the support part.

Based on the optical sensor being disposed at the first side of the support part, the reflector may be disposed on a main board facing the optical sensor, and based on the optical sensor being disposed at the second side of the support part, the reflector may be disposed on the cover facing the optical sensor.

The reflector may be integrally formed with the main body.

In the optical sensor, each of an exit angle of light emitted by the light source onto the reflector and an incident angle of light reflected from the reflector to the detector may be in a range of from 90 degrees to 180 degrees.

In the optical sensor, a distance between a center of the light source and a center of the detector may be in at least one of a range of from 50 μm to 125 μm or a range of from 700 μm to 2000 μm.

In the optical sensor, the light source, and the detector may be disposed on a same plane.

In the optical sensor, a vertical distance between the light source and the detector, which are disposed on the same plane, and the reflector may be in a range of from 10 μm to 1000 μm.

The cover may be made of a glass material, and the support part is made of a plastic material.

According to another aspect of an example embodiment, there is provided a method of estimating an optical-based force based on an apparatus including an optical sensor, a support part, a cover, and a main body, the method including measuring an optical signal based on the apparatus contacting an object, by using the optical sensor disposed at the support part connected to two sides the cover, supporting the cover, and protruding toward an inside of the main body, the cover being disposed at a first side of the main body and configured to contact the object, and estimating a contact force of the object based on the measured optical signal by using the optical sensor.

The measuring of the optical signal may include measuring the optical signal by emitting light onto a reflector and detecting light reflected from the object.

The estimating of the contact force of the object based on the optical signal may include obtaining a degree of deformation of the support part, which is deformed by a pressing force of the object on the cover, based on an intensity of the optical sensor, and estimating the contact force of the object based on the obtained degree of deformation.

According to another aspect of an example embodiment, there is provided an apparatus configured to estimate blood pressure, the apparatus including a main body, a cover disposed at a first side of the main body and configured to contact an object, a first sensor disposed on a first side of the cover, and based on being in contact with the object, configured to measure a photoplethysmography (PPG) signal, a support part connected to two sides of the cover, supporting the cover, and protruding toward an inside of the main body, a second sensor disposed on the support part, the second sensor including a light source configured to emit light onto a reflector, a detector configured to detect light reflected from the reflector, and a circuit unit configured to estimate a contact force of the object based on the detected light, and a processor configured to estimate blood pressure based on the estimated contact force and the PPG signal.

In the second sensor, the circuit unit may be further configured to obtain a degree of deformation of the support part, which is deformed by a pressing force of the object on the cover, based on an intensity of an optical signal, and estimate the contact force of the object based on the obtained degree of deformation.

In the second sensor, each of an exit angle of light emitted by the light source onto the reflector and an incident angle of light reflected from the reflector to the detector may be in a range of from 90 degrees to 180 degrees.

In the second sensor, a distance between a center of the light source and a center of the detector may be in at least one of a range of from 50 μm to 125 μm or a range of from 700 μm to 2000 μm.

The processor may be further configured to obtain an oscillometric waveform envelope based on the estimated contact force and the PPG signal, and estimate blood pressure based on the obtained oscillometric waveform envelope.

According to another aspect of an example embodiment, there is provided an apparatus configured to estimate blood pressure, the apparatus including a main body, a cover disposed at a first side of the main body and configured to contact an object, a first sensor disposed on a first side of the cover, and based on being in contact with the object, configured to measure a photoplethysmography (PPG) signal, a support part connected to two sides of the cover, supporting the cover, protruding toward an inside of the main body, and having one or more light paths, a second sensor disposed at a first side of the support part, the second sensor including a light source configured to emit light onto a reflector through light paths formed in the support part, the reflector disposed on a second side of the cover, a detector configured to detect light reflected from the reflector and transmitted through the light paths, and a circuit unit configured to estimate a contact force of the object based on the detected light, and a processor configured to estimate blood pressure based on the estimated contact force and the PPG signal.

A partition wall is formed between the light paths such that light emitted by the light source and light incident on the detector may be blocked from each other.

According to another aspect of an example embodiment, there is provided a wearable apparatus including a first main body, a strap, an apparatus configured to estimate an optical-based force, the apparatus including a second main body, a cover disposed at a first side of the main body and configured to contact an object, a support part connected to two sides of the cover, supporting the cover, and protruding toward an inside of the main body, and an optical sensor disposed on the support part, the optical sensor including a light source configured to emit light onto a reflector, a detector configured to detect light reflected from the reflector, and a circuit unit configured to estimate a contact force of the object based on the detected light.

BRIEF DESCRIPTION OF THE DRAWINGS

The above and/or other aspects, features, and advantages of certain example embodiments of the disclosure will be more apparent from the following description taken in conjunction with the accompanying drawings, in which:

FIGS. 2A and 2B are diagrams illustrating an example of a structure of an apparatus configured to estimate an optical-based force;

FIG. 7 is a diagram illustrating a structure of an apparatus configured to estimate blood pressure including an apparatus configured to estimate an optical-based force according to another example embodiment;

FIG. 9 is a diagram illustrating a structure of an apparatus configured to estimate blood pressure including an apparatus configured to estimate an optical-based force according to another example embodiment;

Figure 1:
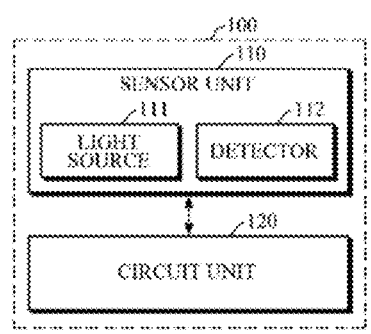
FIG. 1 is a block diagram illustrating an optical sensor in an apparatus configured to estimate an optical-based force according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Details of example embodiments are included in the following detailed description and drawings. Advantages and features, and a method of achieving the same will be more clearly understood from the following example embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof.

An apparatus configured to estimate an optical-based force may be mounted in a terminal, such as a smart phone, a tablet personal computer (PC), a desktop computer, a laptop computer, and the like. In addition, the apparatus configured to estimate an optical-based force may be implemented in a wearable device which may be worn on an object so that a user may more easily measure bio-information (e.g., blood pressure) while carrying the wearable device. For example, the apparatus configured to estimate an optical-based force may be implemented in a wearable device, such as a wristwatch-type wearable device, a bracelet-type wearable device, a wristband-type wearable device, a ring-type wearable device, a glasses-type wearable device, an earbud-type wearable device, a headband-type wearable device, and the like. However, the wearable device is not limited thereto and may be modified for various purposes, such as a fixed-type device for use in medical institutions to measure and analyze bio-information.

FIG. 1 is a block diagram illustrating an optical sensor in an apparatus configured to estimate an optical-based force according to an example embodiment.

The apparatus configured to estimate an optical-based force includes an optical sensor 100. Referring to FIG. 1, the optical sensor 100 may include a sensor unit 110 and a circuit unit 120, and the sensor unit 110 may include a light source 111 and a detector 112.

The circuit unit 120 may be electrically connected to the sensor unit 110 and may control the operation of the sensor unit 110. For example, under the control of the circuit unit 120, the light source 111 of the sensor unit 110 may emit light onto a reflector and the detector 112 may measure an optical signal reflected from the reflector. Based on the measured optical signal, the circuit unit 120 may estimate a contact force of an object. An example of estimating a contact force by using the optical sensor 100 will be described in detail below.

FIGS. 2A and 2B are diagrams illustrating an example of a structure of an apparatus configured to estimate an optical-based force, and are cross-sectional views illustrating a right portion of a structure of an inverted main body of a wristwatch-type wearable device. In the following description, a lower portion of the main body is defined as a Z direction, and an upper portion thereof is defined as a Z' direction.

Referring to FIGS. 2A and 2B, the apparatus configured to estimate an optical-based force includes a main body 200, a cover 210 disposed at a lower portion (first side) of the main body to come into contact with an object when the main body is worn on the object, a support part 230 coupled (connected) to two sides of the cover 210, supporting the cover 210, and protruding toward the inside of the main body 200, a main board 250 disposed on the support part 230, an optical sensor 240, and a reflector 260 from which light is reflected.

The optical sensor 240 may be disposed on the support part 230, and may estimate a contact force of the object by using an optical signal. For example, at least one or more optical sensors 240 may be disposed at an upper portion or a lower portion of the support part 230. FIG. 2A illustrates a structure in which the optical sensor 240 is disposed at the lower portion (a first side) of the support part 230, and light emitted by the light source 111 of the optical sensor 240 is reflected from the reflector 260 to be incident on the detector 112 of the optical sensor 240. FIG. 2B illustrates a structure in which the optical sensor 240 is disposed at the upper portion (a second side opposite to the first side) of the support part 230, and light emitted by the light source 111 of the optical sensor 240 is reflected from the reflector 260 disposed on the main board 250 to be incident on the detector 112 of the optical sensor 240. In addition, a plurality of optical sensors 240 may be disposed at the upper portion or the lower portion of the support part 230. While FIGS. 2A and 2B illustrate an example in which the optical sensor 240 is disposed at the right portion of a structure of an inverted main body of a wearable device, a pair of optical sensors 240 may be disposed at the left portion thereof. The arrangement of the optical sensor 240 is not limited thereto.

Figure 3:
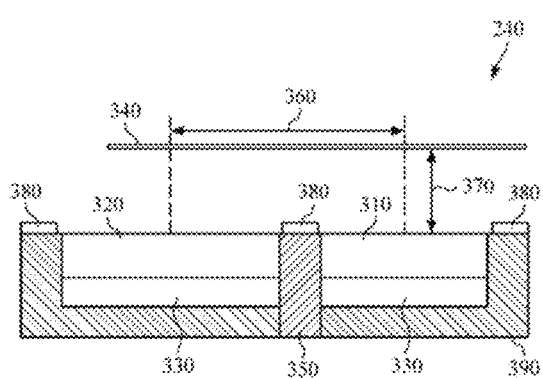
FIG. 3 is a diagram illustrating a structure of an optical sensor.

FIG. 3 is a diagram illustrating a structure of the optical sensor 240 according to an example embodiment.

Referring to FIG. 3, the optical sensor 240 includes a light source 310 configured to emit light onto a reflector 340, a detector 320 configured to detect light reflected from the reflector 340, and a circuit unit 330 configured to estimate a contact force of an object based on the reflected light. In this case, an object (e.g., mirror) for reflecting light, emitted by the light source 310, toward the detector 320 may be used as the reflector 340. In addition, when the optical sensor 240 may be disposed at the upper portion of the support part 230, the reflector 340 may be formed on the main board 250, and when the optical sensor 240 is disposed at the lower portion of the support part 230, the reflector 340 may be formed on the cover 210 facing the optical sensor 240. In another example, as for the reflector 340, reflection characteristics of peripheral components may be used based on the position of the optical sensor 240 disposed at the support part 230, in which case the reflector 340 may be replaced with a structure in the apparatus configured to estimate an optical-based force.

In the case where there is a height difference between the light source 310 and the detector 320, the light source 310 and the detector 320 may deviate from an operation region that allows for sensitive operation of the sensor, such that surfaces of the light source 310 and the detector 320 may be disposed on the same plane.

In addition, the light source 310 and the detector 320 may be spatially separated by a partition wall 350 in a packaging structure 390, such that it is possible to prevent photons, emitted from the light source 310, from directly entering the detector 320. In addition, the partition wall 350 may be at the same height as the plane of the light source 310 and the detector 320, so as not to restrict light incident on the detector 320.

The circuit unit 330 may be connected to the light source 310 and the detector 320, and may further include a heat dissipation unit to prevent a change in characteristics due to a temperature change.

In the optical sensor 240, the light source 310, the detector 320, and the circuit unit 330 are stacked to be integrated in the packaging structure 390. The circuit unit 330 may be provided as a separate component from the light source 310 and the detector 320. The stacked structure may be formed by a semiconductor process, thereby minimizing wiring and stably obtaining a power source from the detector 320. Further, a signal quality may be improved, and a separate process such as wire bonding and the like may be minimized.

Electrodes 380 configured to drive and control the light source 310 and/or the detector 320 may be disposed at the top or bottom of the packaging.

In order to manufacture the optical sensor 240 in a compact size and in mass production and to improve performance of the optical sensor 240, a distance 360 between the center of the light source 310 and the center of the detector 320 may be set to be relatively small, and an exit angle of light emitted from the light source 310 and an incident angle of light incident on the detector 320 may be set to be in a relatively wide range. In addition, when a vertical distance 370, corresponding to an initial gap indicative of an initial installation state, between the light source 310 and the detector 320 and the reflector 340 is located within a distance corresponding a point of intersection between the exit angle and the incident angle, the emitted light may be present in a dead zone in which the light may not enter the detector 320, such that the vertical distance 370 may be set so as not to be within the distance corresponding to the point of intersection. For example, the distance 360 between the center of the light source 310 and the center of the detector 320 may be in a range of from 50 μm to 125 μm or in a range of from 700 μm to 2000 μm. In addition, the vertical distance 370 between the light source 310 and the detector 320, which are disposed on the same plane, and the reflector 340 may be in a range of from 10 μm to 1000 μm. In this case, each of the exit angle of light emitted from the light source 310 to the reflector 340 and the incident angle of the light incident from the reflector 340 to the detector 320 may be in a wide range of 90 degrees to 180 degrees. However, embodiments are not limited thereto.

In addition, the optical sensor 240 may measure an optical signal when an object is placed on the cover 210, and may estimate a contact force of the object based on the measured optical signal. For example, the circuit unit 330 of the optical sensor 240 may obtain a degree of deformation of the support part 230 based on an intensity of the optical signal which is changed by a pressing force of the object on the cover 210, and may estimate a contact force of the object based on the obtained degree of deformation.

Referring back to FIGS. 2A, 2B, and 3, when the object presses the cover 210 of the main body 200, structures of the main body, e.g., the cover 210 and the support part 230, are deformed differently by the pressing force, and the optical sensor 240 may estimate displacement indicative of a degree of deformation (e.g., displacement 270 of the cover 210 being 70 μm and displacement 280 of the support part 230 being 20 μm in FIG. 2A, and displacement 270 of the cover 210 being 70 μm and displacement 290 of the support part 230 being 30 μm in FIG. 2B), to estimate each contact force applied by the object, as shown in the following Equation 1.

$$F = K \times \Delta x \quad \text{[Equation 1]}$$

Herein, F denotes the contact force, K denotes a predetermined spring constant according to a material, and $\Delta x$ denotes displacement. Here, the displacement may vary according to a measurement position with respect to a point of action of a structure. In addition, the displacement may also vary according to a material of a structure. For example, it may be determined that the cover 210 is made of a glass material having a relatively small displacement, and the support part 230 is made of a plastic material having a large displacement.

In an example embodiment, when the contact force is estimated using displacement of the support part 230, displacement obtained from the support part 230 may be indirectly estimated using the optical sensor 240 disposed at the support part 230. For example, when the object is placed on the cover 210 and presses the cover 210, the circuit unit 330 of the optical sensor 240 may measure an intensity of the optical signal obtained by the detector 320, and may estimate displacement by using a displacement estimation model that defines a relationship between the measured intensity of the optical signal and the displacement of the support part 230. In this case, the model may be defined as a linear or nonlinear equation.

Figure 4:
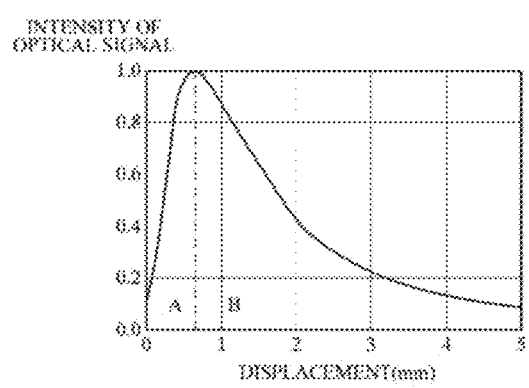
FIG. 4 is a graph showing a relationship between an intensity of an optical signal and displacement.

FIG. 4 is a graph showing a relationship between an intensity of an optical signal and displacement. Referring to FIG. 4, displacement in the X axis may be estimated according to an intensity of an optical signal corresponding to the Y axis. In FIG. 4, region A is a region in which the intensity of the optical signal with high linearity increases according to an increase in displacement, and region B is a region in which the intensity of the optical signal gradually decreases according to an increase in displacement. Region A and region B may be separately used according to the type of the optical sensor 240. For example, when the distance 360 between the center of the light source 310 and the center of the detector 320 is in a range of from 700 μm to 2000 μm, a displacement estimation model that defines a relationship between the intensity of the optical signal and displacement in region A may be used, and when the distance 360 between the center of the light source 310 and the center of the detector 320 is in a range of from 50 μm to 125 μm, a displacement estimation model that defines a relationship between the intensity of the optical signal and displacement in region B may be used.

By using the estimated displacement, the optical sensor 240 may estimate a contact force of the object by using the above Equation 1. For example, the circuit unit 330 of the optical sensor 240 may estimate the contact force of the object by multiplying the displacement, estimated using the optical signal, by the spring constant value corresponding to a material of the support part 230 and pre-stored in the storage. In this case, there may be at least one or more optical sensors 240. When a plurality of optical sensors 240 are used, the displacement estimation model may define the relationship between the intensity of the optical signal, measured by the respective optical sensors 240, and displacement as a parameter, in which case the parameter of the model increases such that the optical sensor 240 may more accurately estimate displacement, thereby more accurately estimating a contact force.

Figure 5:
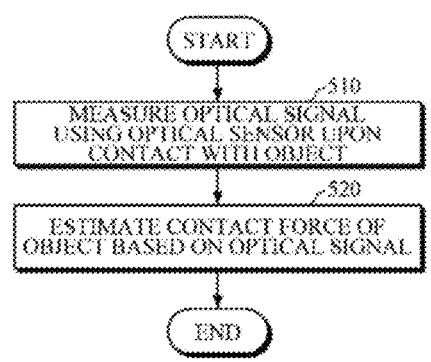
FIG. 5 is a flowchart illustrating a method of estimating an optical-based force according to an example embodiment.

FIG. 5 is a flowchart illustrating a method of estimating an optical-based force according to an example embodiment. The method of FIG. 5 is an example of a method of estimating an optical-based force, which is performed by the aforementioned apparatus configured to estimate an optical-based force, and will be briefly described below.

First, by using the optical sensor disposed at the support part, which is coupled to both sides of the cover disposed at the lower portion of the main body to come into contact with an object, supports the cover, and protrudes toward the inside of the main body, the apparatus configured to estimate an optical-based force may measure an optical signal upon contact with the object in operation 510. For example, the optical sensor includes the light source and the detector, and the apparatus configured to estimate an optical-based force may measure the optical signal by emitting light onto the reflector using the light source and by detecting light reflected from the reflector using the detector.

Then, the apparatus configured to estimate an optical-based force may estimate a contact force of the object based on the optical signal measured using the optical sensor in operation 520. For example, the apparatus configured to estimate an optical-based force may obtain a degree of deformation of the support part which is deformed by a pressing force of the object on the cover, and may estimate the contact force of the object based on the obtained degree of deformation. For example, the circuit unit of the optical sensor may measure an intensity of the optical signal, which is obtained by the detector when the object is placed on the cover and presses the cover, and may estimate displacement by using a displacement estimation model that defines a relationship between the measured intensity of the optical signal and the degree of deformation of the support part.

Figure 6:
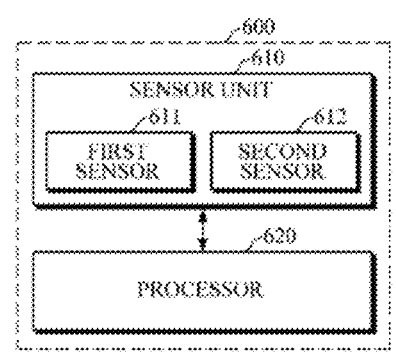
FIG. 6 is a block diagram illustrating an apparatus configured to estimate blood pressure including an apparatus configured to estimate an optical-based force according to another example embodiment.

FIG. 6 is a block diagram illustrating an apparatus configured to estimate blood pressure including an apparatus configured to estimate an optical-based force according to another example embodiment, and FIG. 7 is a diagram illustrating a structure of an apparatus configured to estimate blood pressure including an apparatus configured to estimate an optical-based force according to another example embodiment.

Referring to FIG. 6, an apparatus 600 configured to estimate blood pressure may include a sensor unit 610 and a processor 620, and the sensor unit 610 may include a first sensor 611 and a second sensor 612. The second sensor 612 corresponds to the optical sensor 240 described above with reference to FIGS. 1 to 3, such that a detailed description of an example of estimating a contact for will be omitted.

The sensor unit 610 may be electrically connected to the processor 620. Under the control of the processor 620, the sensor unit 610 may measure a bio-signal from an object when the object is placed on the sensor unit 610 and may measure a contact force applied by the object to the sensor unit 610 when the object is in contact with the sensor unit 610. For example, the first sensor 611 may measure a pulse wave signal (e.g., photoplethysmography (PPG) signal) from the object, and the second sensor 612 may emit light onto, e.g., a reflector and measure an optical signal reflected from the reflector when the object, being in contact with the first sensor 611, applies force, and may estimate a contact force of the object based on the measured optical signal. The object may be a body part that may come into contact with the sensor unit 610, and may be, for example, a body part where pulse waves may be more easily measured based on the PPG signal. For example, the object may be a finger having a high blood vessel density in the human body, but is not limited thereto and may be a surface of the wrist that is adjacent to the radial artery and an upper part of the wrist where venous blood or capillary blood passes or a peripheral region of a human body, such as a toe, or the like.

The processor 620 may control the operation of the sensor unit 610, and may estimate blood pressure based on the pulse wave signal and the contact force which are received from the sensor unit 610. For example, the processor 620 may estimate blood pressure based on the PPG signal, acquired by the first sensor 611, and the contact force estimated by the second sensor 612.

Referring to FIG. 7, the apparatus 700 configured to estimate blood pressure may include a main body 700, a cover 710 disposed at a lower portion of the main body to come into contact with an object when the main body is worn on the object, a support part 730 coupled to two sides of the cover 710, supporting the cover 710, and protruding toward the inside of the main body, a main board 750 disposed on the support part 730, a first sensor 720, a second sensor 740, and a reflector 760 from which light is reflected.

The first sensor 720 is disposed on a first side of the cover 710 and may measure a PPG signal when the object is placed on the cover 710 where the first sensor 720 is disposed. The second sensor 740 may be provided on a first side of the support part 730, and the reflector 760 may be provided on a second side of the cover 730 to face the second sensor 740. The second sensor 740 corresponds to the optical sensor 240 described above with reference to FIGS. 1 to 3, such that a detailed description of an example of estimating a contact force will be omitted.

The first sensor 720 may include one or more light sources configured to emit light of different wavelengths, and one or more detectors configured to detect light having different wavelengths and scattered or reflected from body tissue such as a skin surface or blood vessels of the object. The light source may include a light emitting diode (LED), a laser diode (LD), a phosphor, and the like, but is not limited thereto. In addition, the detector may include a photo diode, a photo transistor (PTr), or an image sensor (e.g., complementary metal-oxide semiconductor (CMOS) image sensor), but is not limited thereto. For measuring two or more PPG signals, the first sensor 720 may include an array of one or more light sources and/or an array of one or more detectors. In this case, the one or more light sources may emit light of different wavelengths, and the respective light sources may be positioned at different distances from the detector.

Referring back to FIGS. 6 and 7, the processor 620 may be disposed on the main board 750 of the apparatus 600 and configured to estimate blood pressure, and the processor 620 may estimate blood pressure based on the PPG signal, acquired by the first sensors 611 and 720, and the contact force estimated by the second sensors 612 and 740. For example, the processor 620 may obtain an oscillometric waveform envelope based on the acquired PPG signal and the estimated contact force, and may estimate blood pressure by using the obtained oscillometric waveform envelope.

Figure 8A:
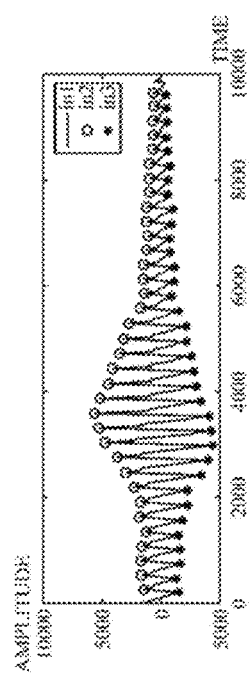
FIGS. 8A and 8B are diagrams explaining an example of estimating blood pressure based on oscillometry.
Figure 8B:
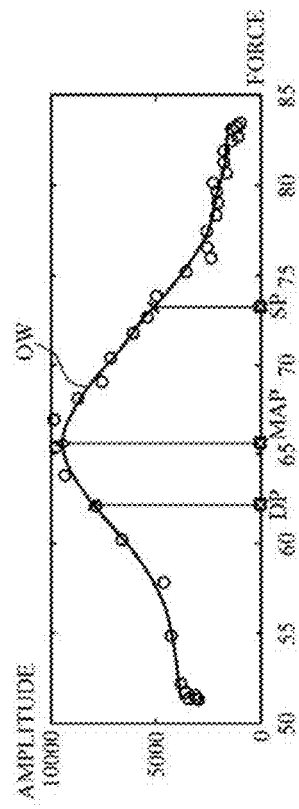

FIGS. 8A and 8B are diagrams explaining an example of estimating blood pressure based on oscillometry.

FIG. 8A is a diagram illustrating a change in amplitude of a PPG signal when an object placed on the cover 710 gradually increases a pressing force, and FIG. 8B is a diagram illustrating an oscillometric waveform envelope OW which represents a relationship between a change in contact pressure and an amplitude of a PPG signal.

The processor 620 may extract, for example, a peak-to-peak point by subtracting a negative (−) amplitude value in3 from a positive (+) amplitude value in2 of a waveform envelope in1 of the PPG signal at each measurement time point. Further, the processor 620 may obtain an oscillometic waveform envelope OW by plotting the peak-to-peak amplitude at each measurement time point against a contact force value at a corresponding time point and by performing, for example, polynomial curve fitting.

The processor 620 may estimate blood pressure by using the generated oscillometic waveform envelope OW. The processor 620 may estimate Mean Arterial Pressure (MAP) based on a contact pressure value MP at a maximum point MA of the pulse wave in the oscillogram. For example, the processor 620 may determine, as the MAP, the contact pressure value MP itself at the maximum point MA of the pulse wave, or may obtain the MAP from the contact pressure value MP by using a pre-defined MAP estimation equation. In this case, the MAP estimation equation may be expressed in the form of various linear or non-linear combination functions, such as addition, subtraction, division, multiplication, logarithmic value, regression equation, and the like, with no particular limitation.

Further, the processor 620 may obtain, as a feature value, at least one of a contact pressure value at a maximum amplitude point and contact pressure values at points to the left and right of the maximum amplitude point and having a preset ratio to the contact pressure value at the maximum amplitude point in the oscillometric waveform envelope, and may estimate blood pressure based on the obtained feature value. For example, the processor 620 may estimate diastolic blood pressure and systolic blood pressure by using contact pressure values DP and SP, respectively, corresponding to amplitude values at points to the left and right of the maximum point MA of the pulse wave and having a predetermined ratio, e.g., 0.5 to 0.7, to the amplitude value at the maximum point MA of the pulse wave. The processor 620 may determine the contact pressure values DP and SP as the diastolic blood pressure and systolic blood pressure, respectively, or may estimate the diastolic blood pressure and systolic blood pressure from the respective contact pressure values DP and SP by using pre-defined diastolic blood pressure and systolic blood pressure estimation equations.

FIG. 9 is a diagram illustrating a structure of an apparatus configured to estimate blood pressure including an apparatus configured to estimate an optical-based force according to another example embodiment.

The apparatus configured to estimate blood pressure may include a main body 900, a cover 910 disposed at a lower portion of the main body to come into contact with an object when the main body is worn on the object, a support part 930 coupled to two sides of the cover 910, supporting the cover 910, protruding toward the inside of the main body 900, and including one or more light paths 915, a first sensor 920, and a second sensor 940.

The first sensor 920 is disposed on a lower end on a first side of the cover 910 and may measure a PPG signal when the object is placed on the cover 910 where the first sensor 920 is disposed.

The second sensor 940 may include a light source disposed at an upper end of the support part 930 and emitting light onto a reflector 960, disposed at an upper end on a second side of the cover 910, through a light path 915 formed at the support part 930, a detector for detecting light reflected from the reflector 960 and incident through the light path, and a circuit unit configured to estimate a contact force of the object based on the light. The second sensor 940 corresponds to the optical sensor 240 described above with reference to FIGS. 1 to 3, such that a detailed description of an example of estimating a contact force will be omitted.

FIG. 9 illustrates a structure in which the second sensor 940 is disposed at the upper end on a second side of the support part 930 and emits light toward the cover 910 through the light path 915 (e.g., hall) that extends from the first side to the second side of the support part 930. In this case, the reflector 960 may be separately provided on the cover 910 to face the light path 915, or the cover 910 which is a structure in the apparatus configured to estimate blood pressure may be used as the reflector.

There may be a plurality of light paths, and a partition wall may be formed between the light paths so that light emitted by the light source and light incident on the detector may be blocked from each other.

In the second sensor 940, the circuit unit may obtain a deformation degree 995 of the support part 930 which is deformed by a pressing force 970 of the object on the cover 910, and may estimate a contact force of the object based on the obtained deformation degree.

A distance between the center of the light source and the center of the detector in the second sensor 940 may be in a range of from 50 μm to 125 μm or in a range of from 700 μm to 2000 μm, the light source and the detector are disposed on the same plane, and a vertical distance between the plane and the reflector may be in a range of from 10 μm to 1000 μm. However, embodiments are not limited thereto.

A processor may be disposed on the main board 950 of the apparatus and configured to estimate blood pressure, and the processor may estimate blood pressure based on the PPG signal, acquired by the first sensor 920, and the contact force estimated by the second sensor 940. For example, the processor may obtain an oscillometric waveform envelope based on the acquired PPG signal and the estimated contact force, and may estimate blood pressure by using the obtained oscillometric waveform envelope.

Figure 10:
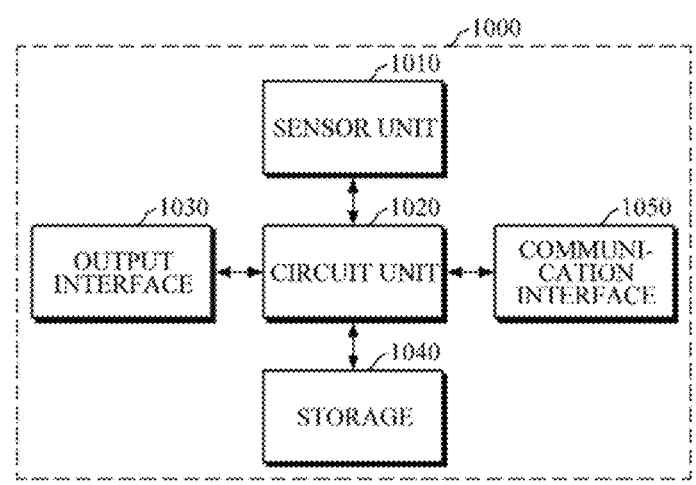
FIG. 10 is a block diagram illustrating an apparatus configured to estimate an optical-based force according to another example embodiment.

FIG. 10 is a block diagram illustrating an apparatus configured to estimate an optical-based force according to another example embodiment.

Referring to FIG. 10, an apparatus 1000 configured to estimate an optical-based force may include a sensor unit 1010, a circuit unit 1020, an output interface 1030, a storage 1040, and a communication interface 1050. The sensor unit 1010 and the circuit unit 1020 are described above with reference to FIGS. 1 to 4, such that a detailed description thereof will be omitted.

The output interface 1030 may output various processing results of the circuit unit 1020, e.g., a contact force of an object. For example, the output interface 1030 may visually output the contact force through a display module, or may output the contact force in a non-visual manner by voice, vibrations, tactile sensation, and the like using a speaker module, a haptic module, or the like.

The storage 1040 may store various processing results of the circuit unit 1020. In addition, the storage 1040 may also store the intensity of the light source, the sensitivity of the detector, and the like of the sensor unit 1010, as well as a correction equation, a spring constant according to a material, and the like which are obtained in the initial state of the sensor unit 1010.

In this case, the storage 1040 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The communication interface 1050 may communicate with an external device under the control of the circuit unit 1020 by using various wired or wireless communication techniques, to transmit and receive various data. For example, the communication interface 1050 may transmit a contact force estimation result to the external device. In addition, the communication interface 1050 may receive a variety of information required for estimating the contact force from the external device. In this case, the external device may include an information processing device, such as a smartphone, a tablet PC, a desktop computer, a laptop computer, and the like.

In this case, the communication techniques may include Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, the communication techniques are not limited thereto.

Figure 11:
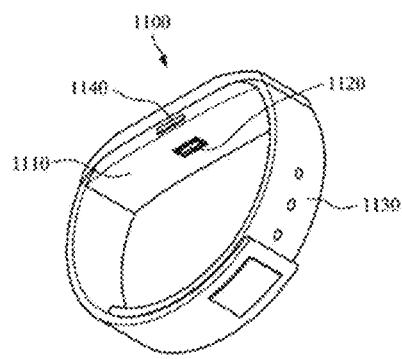
FIGS. 11 and 12 are diagrams illustrating examples of a wearable device.
Figure 12:
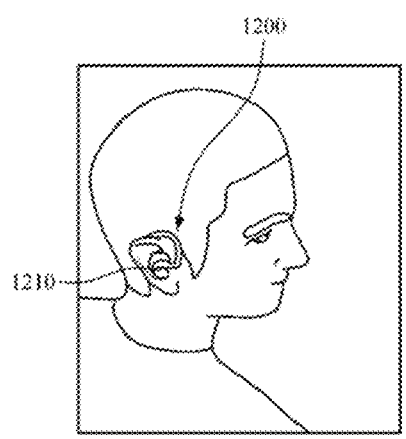

FIGS. 11 and 12 are diagrams illustrating a wearable device according to an example embodiment. As illustrated herein, the aforementioned example embodiments of the apparatus 600 to estimate blood pressure may be mounted in a smartwatch worn on a wrist, a smart band-type wearable device, and earbuds, but are not limited thereto.

Referring to FIG. 11, a wristwatch-type wearable device 1100 may include a main body 1110 and a strap 1130.

The main body 1110 may have various shapes, and various modules for performing the aforementioned function of estimating blood pressure and various other functions of the wearable device 1100 may be mounted inside or on a surface of the main body 1110. A battery for supplying power to the various modules of the device 1100 may be embedded in the main body 1110 or the strap 1130.

The strap 1130 may be connected to both ends of the main body 1110. The strap 1130 may be flexible so as to be wrapped around the user's wrist. The strap 1130 may be in the form of a strap detachable from the wrist, or may be in the form of a non-detachable band. Air may be injected into the strap 1130 or the strap 1130 may be provided with an air bladder, so as to have elasticity according to a change in pressure applied to the wrist, and the change in pressure of the wrist may be transmitted to the main body 710.

A sensor 1120 for measuring blood pressure may be mounted in the main body 1110. As illustrated herein, the sensor 1120 may be mounted on a rear surface of the main body 1110 which comes into contact with a user's wrist. When an object (e.g., finger) is placed on the rear surface of the main body, the sensor 1120 may estimate a PPG signal and a contact force.

A manipulator 1140 may be mounted on one side of the main body 1110 and may receive a user's control command and transmit the control command to a processor. The manipulator 1140 may have a power button to input a command to turn on/off the wearable device 1100.

A processor may be mounted in the main body 1110 and may be electrically connected to various components mounted in the wearable device 1100. The processor may estimate blood pressure by using a signal measured by the sensor 1120, as described above.

In addition, a storage for storing processing results of the processor and a variety of information may be mounted in the main body 1110. In this case, the variety of information include information related to the functions of the wearable device 1100, in addition to reference information related to estimating blood pressure.

A display may be disposed on a front surface of the main body 1110. The display may include a touch panel for receiving touch input. The display may receive a user's touch input and transmit the touch input to the processor, and may display processing results of the processor. For example, the display may display an estimated blood pressure value and warning/alarm information.

Moreover, a communication interface for communicating with an external device, such as a user's mobile terminal, may be mounted in the main body 1110. The communication interface may transmit a blood pressure estimation result to the external device, e.g., a user's smartphone, so that the estimation result may be displayed for the user. However, the communication interface is not limited thereto, and may transmit and receive a variety of required information.

Referring to FIG. 12, an ear-wearable device 1200 may include a main body and an ear strap. A user may wear the ear-wearable device 1200 by hanging the ear strap on the auricle. The ear strap may be omitted depending on a shape of the ear-wearable device 1200. The main body may be inserted into the external auditory meatus. A sensor 1210 corresponding to sensors described in the example embodiments may be mounted in the main body. Further, the ear-wearable device 1200 may provide the user with a blood pressure estimation result as sound, or may transmit the estimation result to an external device, e.g., a mobile device, a tablet PC, etc., through a communication module provided in the main body.

Figure 13:
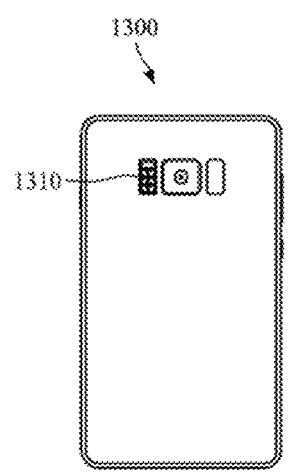
FIG. 13 is a diagram illustrating an example of a mobile device.

Referring to FIG. 13, the apparatus configured to estimate blood pressure may be implemented as a mobile device 1300 such as a smartphone.

The mobile device 1300 may include a housing and a display panel. The housing may form an exterior of the mobile device 1300. The housing has a first surface, on which a display panel and a cover glass may be disposed sequentially, and the display panel may be exposed to the outside through the cover glass. A sensor 1310 corresponding to sensors described in the example embodiments, a camera module and/or an infrared sensor, and the like may be disposed on a second surface of the housing.

For example, the sensor 1310 may be disposed on a front surface or a rear surface of a smartphone main body 1300, in which the sensor 1310 includes a first sensor for measuring a PPG signal from a user's finger, and a second sensor configured to estimate a contact force by using an optical signal.

In addition, when a user transmits a request configured to estimate blood pressure by executing an application and the like installed in the mobile device 1300, the mobile device 1300 may obtain data by using the sensor 1310, may estimate blood pressure by using a processor in the mobile device, and may provide an estimated value as images and/or sounds to the user.

The present disclosure may be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily deduced by programmers of ordinary skill in the art to which the invention pertains.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An apparatus configured to estimate an optical-based force, the apparatus comprising:
   a main body;
   a cover disposed at a first side of the main body and configured to contact an object;
   a support part connected to two sides of the cover, supporting the cover, and protruding toward an inside of the main body; and
   an optical sensor contacting an outer surface of the support part, the optical sensor comprising a light source configured to emit light onto a reflector contacting an outer surface of the cover, a detector configured to detect light reflected from the reflector, and a circuit unit configured to estimate a contact force of the object based on the detected light.

2. The apparatus of claim 1, wherein in the optical sensor, the circuit unit is further configured to:
   obtain a degree of deformation of the support part, which is deformed by a pressing force of the object on the cover, based on an intensity of an optical signal; and
   estimate the contact force of the object based on the obtained degree of deformation.

3. The apparatus of claim 1, wherein at least one or more optical sensors are disposed at a first side or a second side of the support part.

4. The apparatus of claim 3, wherein based on the optical sensor being disposed at the first side of the support part, the reflector is disposed on a main board facing the optical sensor, and based on the optical sensor being disposed at the second side of the support part, the reflector is disposed on the cover facing the optical sensor.

5. The apparatus of claim 1, wherein the reflector is integrally formed with the main body.

6. The apparatus of claim 1, wherein in the optical sensor, each of an exit angle of light emitted by the light source onto the reflector and an incident angle of light reflected from the reflector to the detector is in a range of from 90 degrees to 180 degrees.

7. The apparatus of claim 1, wherein in the optical sensor, a distance between a center of the light source and a center of the detector is in at least one of a range of from 50 μm to 125 μm or a range of from 700 μm to 2000 μm.

8. The apparatus of claim 1, wherein in the optical sensor, the light source, and the detector are disposed on a same plane.

9. The apparatus of claim 8, wherein in the optical sensor, a vertical distance between the light source and the detector, which are disposed on the same plane, and the reflector is in a range of from 10 μm to 1000 μm.

10. The apparatus of claim 1, wherein the cover is made of a glass material, and the support part is made of a plastic material.

11. A method of estimating an optical-based force based on an apparatus comprising an optical sensor, a support part, a cover, and a main body, the method comprising:
  measuring an optical signal based on the apparatus contacting an object, by using the optical sensor contacting an outer surface of the support part connected to two sides the cover, supporting the cover, and protruding toward an inside of the main body, the cover being disposed at a first side of the main body and configured to contact the object; and
  estimating a contact force of the object based on the measured optical signal by using the optical sensor,
  wherein the optical sensor comprises a light source configured to emit light onto a reflector contacting an outer surface of the cover and a detector configured to detect light reflected from the reflector.

12. The method of claim 11, wherein the measuring of the optical signal comprises measuring the optical signal by emitting light onto a reflector and detecting light reflected from the object.

13. The method of claim 11, wherein the estimating of the contact force of the object based on the optical signal comprises:
  obtaining a degree of deformation of the support part, which is deformed by a pressing force of the object on the cover, based on an intensity of the optical sensor; and
  estimating the contact force of the object based on the obtained degree of deformation.

14. A wearable apparatus comprising:
  a first main body;
  a strap;
  an apparatus configured to estimate an optical-based force, the apparatus comprising:
    a second main body;
    a cover disposed at a first side of the second main body and configured to contact an object;
    a support part connected to two sides of the cover, supporting the cover, and protruding toward an inside of the main body; and
    an optical sensor contacting an outer surface of the support part, the optical sensor comprising a light source configured to emit light onto a reflector contacting an outer surface of the cover, a detector configured to detect light reflected from the reflector, and a circuit unit configured to estimate a contact force of the object based on the detected light.

* * * * *